United States Patent
Iwama et al.

(10) Patent No.: US 11,790,263 B2
(45) Date of Patent: Oct. 17, 2023

(54) PROGRAM SYNTHESIS USING ANNOTATIONS BASED ON ENUMERATION PATTERNS

(71) Applicant: INTERNATIONAL BUSINESS MACHINES CORPORATION, Armonk, NY (US)

(72) Inventors: Futoshi Iwama, Tokyo (JP); Takaaki Tateishi, Yamato (JP); Shin Saito, Sagamihara (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 503 days.

(21) Appl. No.: 16/284,371

(22) Filed: Feb. 25, 2019

(65) Prior Publication Data

US 2020/0272935 A1    Aug. 27, 2020

(51) Int. Cl.
*G06N 20/00* (2019.01)
*G06N 5/02* (2023.01)

(52) U.S. Cl.
CPC ............... *G06N 20/00* (2019.01); *G06N 5/02* (2013.01)

(58) Field of Classification Search
CPC .................................. G06N 20/00; G06N 5/02
See application file for complete search history.

(56) References Cited

U.S. PATENT DOCUMENTS

2013/0185067 A1    7/2013  Ichikawa et al.
2014/0337026 A1    11/2014 Ichikawa et al.
2015/0234654 A1    8/2015  Balasubramanian et al.
2015/0379077 A1    12/2015 Grosse et al.
2016/0271366 A1    9/2016  Quearry
(Continued)

FOREIGN PATENT DOCUMENTS

CN     1478235 A      2/2004
CN     1664779 A      9/2005
(Continued)

OTHER PUBLICATIONS

Emden, M.H. et al "The Semantics of Predicate Logic as a Programming Language" [retrieved on Mar. 2, 2022]. Retrieved from Internet:<https://dl.acm.org/doi/abs/10.1145/321978.321991> (Year: 1976).*

(Continued)

*Primary Examiner* — Miranda M Huang
*Assistant Examiner* — Bart I Rylander
(74) *Attorney, Agent, or Firm* — Tutunjian & Bitetto, P.C.; Randy Emilio Tejeda (57) ABSTRACT

A system for program synthesis using annotations based on enumeration patterns includes a memory device for storing program code, and at least one processor device operatively coupled to the memory device. The at least one processor device is configured to execute program code stored on the memory device to obtain a set of annotated terms including one or more terms each annotated with an enumeration pattern, translate problem text into a formal specification using natural language processing, the formal specification being described as a set of rules associated with predicates, and synthesize one or more terms satisfying the set of rules of the formal specification based on the set of annotated terms to generate a computer program.

19 Claims, 6 Drawing Sheets

(56) References Cited

U.S. PATENT DOCUMENTS

2017/0239576 A1 8/2017 Hsiao
2018/0129478 A1 5/2018 Hatsutori et al.

FOREIGN PATENT DOCUMENTS

| CN | 101339500 A | 1/2009 |
|----|-------------|--------|
| CN | 105335133 A | 2/2016 |
| CN | 108052321 A | 5/2018 |
| CN | 108885545 A | 11/2018 |

OTHER PUBLICATIONS

Salman, O. "Animation of Z Specifications by Translation to Prolog" [retrieved on Mar. 2, 2022]. Retrieved from Internet:<http://journal.dogus.edu.tr/index.php/duj/article/view/261> (Year: 2011).*

Nugues, P. "An Introduction to Language Processing with Perl and Prolog", "Textbook" [retrieved on Mar. 2, 2022]. Retrieved from Internet:<https://direct.mit.edu/coli/article/33/4/601/1957/Briefly-Noted-Publications-Received> (Year: 2004).*

Liu, A. et al, From Datalog Rules to Efficient Programs with Time and Space Guarantees, 2009 [retrieved Jun. 1, 2021]. Retrieved from Internet:<https://dl.acm.org/doi/pdf/10.1145/1552309.1552311>, 38 pages. (Year: 2009) (Year: 2009).*

Shukur, Z., et al, M2Z: A Tool for Translating a Natural Language Software Specification into Z, 2002 [retrieved Jun. 1, 2021]. Retrieved from Internet<https://link.springer.com/content/pdf/10.1007%2F3-540-36103-0_42.pdf>, 5 pages (Year: 2002) (Year: 2002).*

Green, T., et al, Datalog and Recursive Query Processing, 2012 [retrieved Jun. 1, 2021]. Retrieved from Internet< https://courses.cs.washington.edu/courses/cse544/20wi/papers/datalog-NOW-2013.pdf>, 94 pages (Year: 2012) (Year: 2012).*

Kanazawa, M., et al, Parsing and Generation as Datalog Query Evaluation, Retrieved from Internet:<chrome-extension://efaidnbmnnnibpcajpcglclefindmkaj/https://citeseerx.ist.psu.edu/document?repid=rep1&type=pdf&doi=bcb2b5a501a938465d9d6ed785eca6fdd344fb8a> (Year: 2017).*

S. Srivastava et al., From Program Verification to Program Synthesis, POPL '10 Proceedings of the 37th annual ACM SIGPLAN-SIGACT symposium on Principles of programming languages, Jan. 2010, pp. 313-326, vol. 45, Issue 1. ACM, New York, NY.

S. Shan Huang et al, Datalog and Emerging Applications: An Interactive Tutorial, SIGMOD '11 Proceedings of the 2011 ACM SIGMOD International Conference on Management of data, Jun. 2011, pp. 1213-1216, ACM, New York, NY.

Office Action from CN202010115148.5 dated Apr. 20, 2023. (7 pages).

* cited by examiner

PROGRAM SYNTHESIS USING ANNOTATIONS BASED ON ENUMERATION PATTERNS

BACKGROUND

The present invention generally relates to artificial intelligence and machine learning, and more particularly to program synthesis using annotations based on enumeration patterns.

Attempts to synthesize computable expressions (e.g., programs, functions, data) from declaratively written formal expressions can be done at various levels (e.g., compiler, interpreter, domain-specific language (DSL), code fragments from configuration files). In program synthesis, logical formulas can be described using different predicates when the predicates are differently used in computation, even if the predicates have the same meaning. In such a framework, declarative descriptions that can be converted into programs are limited to those that are described in a more conscious way regarding how the logical expression is used in the calculation.

SUMMARY

In accordance with an embodiment of the present invention, a system for program synthesis using annotations based on enumeration patterns is provided. The system includes a memory device for storing program code, and at least one processor device operatively coupled to the memory device. The at least one processor device is configured to execute program code stored on the memory device to obtain a set of annotated terms including one or more terms each annotated with an enumeration pattern, translate problem text into a formal specification using natural language processing, the formal specification being described as a set of rules associated with predicates, and synthesize one or more terms satisfying the set of rules of the formal specification based on the set of annotated terms to generate a computer program.

In accordance with another embodiment of the present invention, a computer-implemented method for program synthesis using annotations based on enumeration patterns is provided. The method includes obtaining a set of annotated terms including one or more terms each annotated with an enumeration pattern, translating problem text into a formal specification using natural language processing, the formal specification being described as a set of rules associated with predicates, and synthesizing one or more terms satisfying the set of rules of the formal specification based on the set of annotated terms to generate a computer program.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The embodiments described herein provide for systems and methods for program synthesis using annotations based on enumeration patterns. The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B) (unless otherwise defined herein). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C) (unless otherwise defined herein). This may be extended, as readily apparent by one of ordinary skill in this and related arts, for as many items listed.

Figure 1:
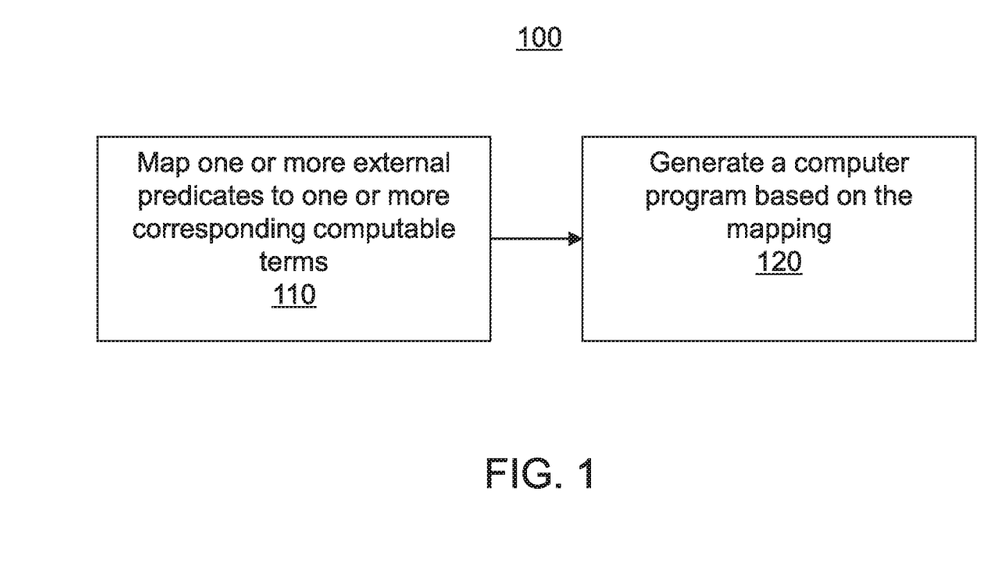
FIG. 1 is a block/flow diagram of an overview of a system/method for program synthesis, in accordance with an embodiment of the present invention.

Referring now to the drawings in which like numerals represent the same or similar elements and initially to FIG. 1, a block/flow diagram is provided illustrating an overview of a system/method 100 for program synthesis using annotations based on enumeration patterns.

At block 110, one or more external predicates can be mapped to one or more corresponding computable terms. External predicates are predicates that are independently defined by a user. For a machine to interpret external predicates, users can provide information connecting the external predicates to computable terms. Such information can include annotations or assertions that can map each external predicate to its corresponding computable term (e.g., a table or a function).

At block 120, a computer program is generated based on the mapping.

Further details regarding the system/method 100 of FIG. 1 will be described in further detail below with reference to FIGS. 2-6.

Figure 2:
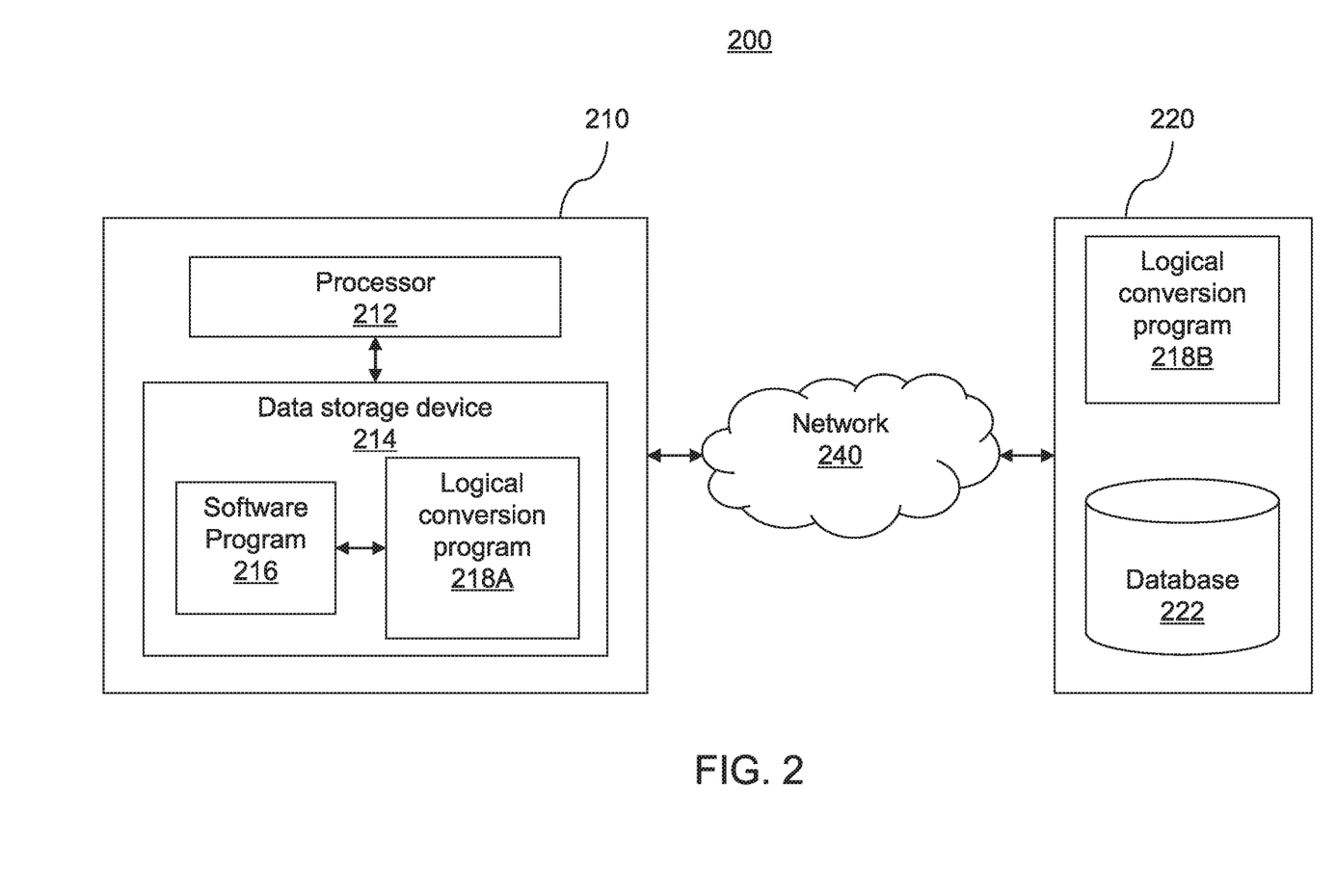
FIG. 2 is a block diagram of a system for program synthesis using annotations based on enumeration patterns, in accordance with an embodiment of the present invention.

With reference to FIG. 2, a block diagram is provided illustrating a computer system 200. In one embodiment, the computer system 200 includes a deductive database system. A deductive database system can refer to a database system that can make deductions based on rules and/or facts stored in the database. Deductive database systems can be implemented within a variety of computer-related operations, including but not limited to data integration, information extraction, networking, program analysis, security and cloud computing.

The system 200 can transform sentences into logical expressions including external predicates using natural language processing, and generate programs from the logical expressions by converting the logical expressions into computable terms using existing terms. The logical expression can be expressed in a way that is conscious of how the logical expression is used in program synthesis in logical formula-to-term conversion systems. The system 200 can determine whether a given logical formula including one or more external predicates can be converted into a computational term by combining existing terms annotated with enumeration patterns. If a declarative description is automatically or semi-automatically generated such that the predicate used in the declarative description subject to conversion is not necessarily in a format convenient for program conversion, the system 200 can enable program synthesis for a wider logical expression which can use external predicates in a more flexible manner.

More specifically, a logical programming language can be used by the system 200 to specify facts, rules and/or queries in the deductive database system. Illustratively, the logical programming language can be Datalog, although other logical programming languages are contemplated. Datalog can perform program synthesis from logical expressions to tables including tuple data, where primitive predicates in a logical expression indicate the tables.

The following describes an exemplary external predicate, annotation and logical expression:

External Predicate: Succ(n, m) (predicate meaning that m is larger than n by 1, where m and n are integers);

Annotation: Succ(n, m)=>n+1=m (mapping from Succ to a function that takes n and computes m), where "=>" refers to a mapping;

Logical expression: Ans(k):-n=3, Succ(n, a), Succ(k, a*2) (find k such that 3+1=a and k+1=a*2 as the solution), where "*" refers to multiplication.

The above example cannot presently be handled by Datalog systems because Succ(n, m) can be converted to a computable term only in the context where m is computed from n. Thus, the part n=3, Succ(n, a) can be converted to a computable term, but Succ(k, 4*2) cannot be converted to a computable term.

In Datalog, a formula can be described using two different external predicates. For example, the external predicates can include Plus1(n, m) and Minus1(n, m). In this example, the annotation can be represented as Plus1(n, m)=>n+1=m and Minus1(n, m)=>n−1=m, and the resulting logical expression can be represented as Ans(k):-n=3, Plus1(n, a), Minus1(a*2, k). This can be converted into the computable term (3+1)*2−1 as a solution k of the logical expression Ans(k). Accordingly, Datalog formulas with external predicates for the logical expression can be converted in accordance with the embodiments described herein.

In one embodiment, the system 200 includes an automated program and/or problem solving system that receives a natural language description as an input and returns a generated program and/or executes problem solving. For example, the input can be text and/or speech expressing a problem to be solved using the system 200. More specifically, the system 200 can include a front-end part associated with natural language processing performed to convert the received input into a logical formula, and a back-end part associated with the conversion of the logical formula to the term (e.g., program or data). The automated program and/or problem solving system can be integrated within a software agent, a robot, etc. to perform tasks using the automated program and/or problem solving system.

As shown, the system 200 includes a computing device 210 in communication with a processing device (e.g., server) 220 interconnected via at least one communication network ("network") 230 that can enable program or data synthesis from a (declarative) formal specification.

In this illustrative embodiment, only one computing device 210 and processing device 220 are shown for brevity. However, the system 200 can include a plurality of computing devices and/or processing devices, in accordance with the embodiments described herein. Accordingly, it is to be understood that FIG. 2 provides only an illustration of one implementation and does not imply any limitations with regard to the environments in which different embodiments may be implemented, and it is to be appreciated that many modifications to the depicted environment can be made based on design and implementation requirements.

The network 230 can include various types of communication networks, such as a wide area network (WAN), local area network (LAN), a telecommunication network, a wireless network, a public switched network and/or a satellite network. The network 230 can include connections, such as wire, wireless communication links, or fiber optic cables.

Computing device 210 can include a processor 212 and a data storage device 214 that is enabled to host and run a software program 216 and logical conversion program 218A, and communicate with the processing device 220 via the network 230. Computing device 210 can be, for example, a mobile device, a telephone, a personal digital assistant, a netbook, a laptop computer, a tablet computer, a desktop computer, or any type of computing device capable of running a program and accessing a network.

Processing device 220 may be a laptop computer, netbook computer, personal computer (PC), a desktop computer, or any programmable electronic device or any network of programmable electronic devices capable of hosting and running a logical conversion program 218B and a database 222. Processing device 220 may also operate in a cloud computing service model, such as Software as a Service (SaaS), Platform as a Service (PaaS), or Infrastructure as a Service (IaaS).

Software program 216 can represent any program or suite of programs that call or communicate with logical conversion program 218A, 218B. The logical conversion program 218A, 218B can be used to generate programs from logical formulas including predicates. More specifically, the logical conversion program 218A, 218B can convert a logical formula as a specification (e.g., rules) to terms (program or data) satisfying the specification. The specification can be described more declaratively based on a set of annotated terms (e.g., describe relations with the same meaning using the same predicate regardless of how the relations are realized in the program synthesis). For example, the system 200 can implement Datalog using a predicate to formalize a problem, which can improve the ability to implement a deductive database system by handling external predicates more flexibly (e.g., use predicates not only as one-way operations, but as relations). It is to be understood and appreciated that other logical programming languages, besides Datalog, can be implemented by the system 200 in accordance with the embodiments described herein.

Further details regarding the operation of the system 200, including the logical conversion program 218A, 218B, will now be described with reference to FIG. 3.

Figure 3:
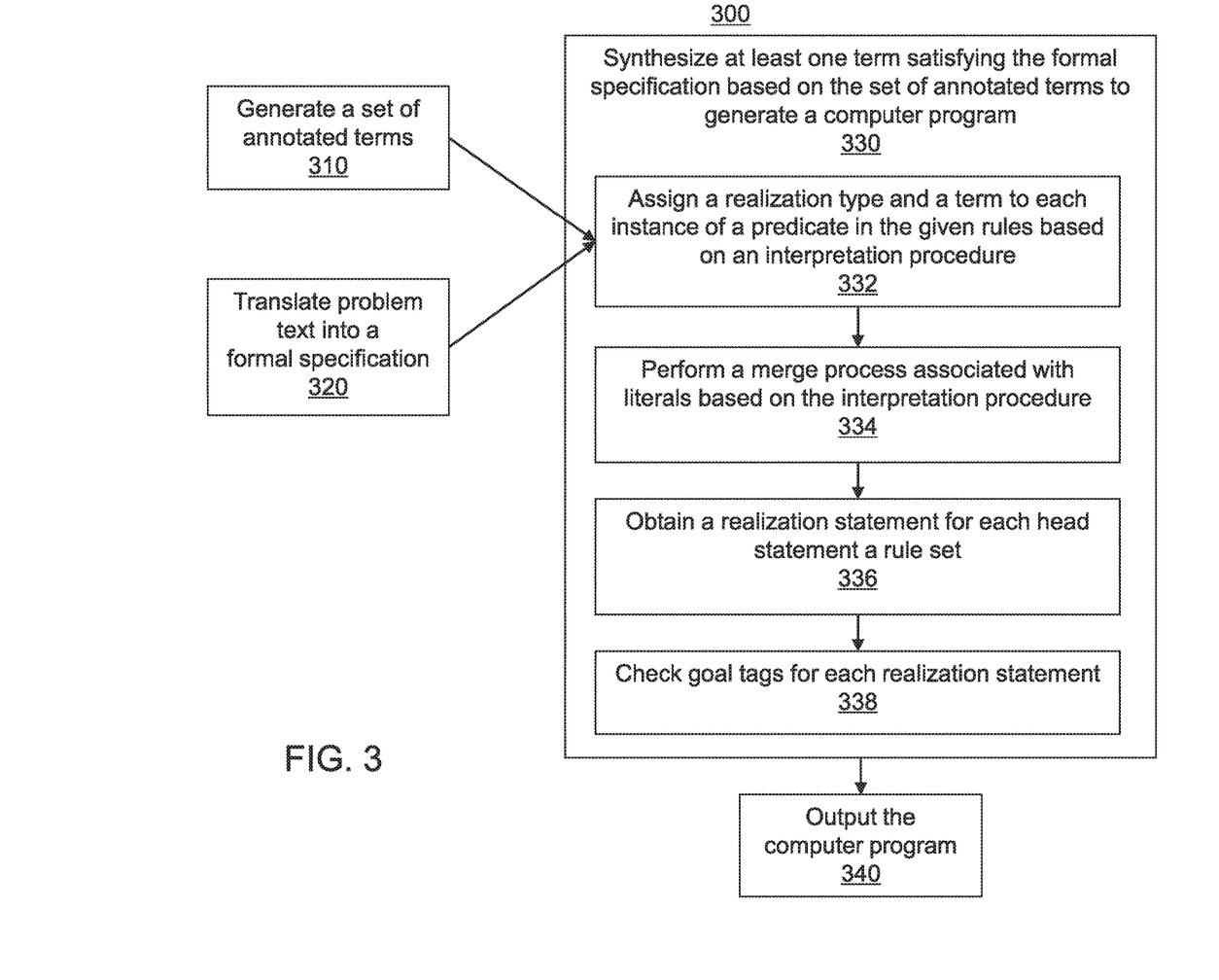
FIG. 3 is a block/flow diagram of a system/method for program synthesis using annotations based on enumeration patterns, in accordance with an embodiment of the present invention.

With reference to FIG. 3, a block/flow diagram is provided illustrating a system/method 300 for program synthesis for external predicates using annotations based on enumeration patterns. As will be described in further detail, the system/method 300 can infer terms satisfying a given rule set based on a set of annotated terms. Exemplary enumeration patterns (e.g., binomial enumeration patterns) for a predicate P(x, y) are provided as follows:

(1) P(x, y|-), where the "|" symbol as used herein refers to an "all" enumeration and the "-" symbol refers to an empty series of variables. That is, a term annotated with this enumeration pattern is a data set that enumerates all x and y satisfying P(x, y) (e.g., the term is a function that returns a set of all x and a set of all y satisfying P(x, y));

(2) P(x, y<|-), where the "<|" symbol as used herein refers to a "partial" enumeration. That is, a term annotated with this enumeration pattern is a data set that enumerates some x and y satisfying P(x, y) (e.g., the term is a function that returns a set of some x and a set of some y satisfying P(x, y));

(3) P(x<|y), P(y<|x). A term annotated with this pattern is a function that enumerates some y (or some x) that satisfy P(x, y) when x (or y) is given (e.g., the term is a function that returns a set of some y (or a set of some x) that satisfies P(x, y) for each given x (or y));

(4) P(x|y), P(y|x). A term annotated with this pattern is a function that enumerates all y (or x) that satisfy P(x, y) when x (or y) is given (e.g., the term is a function that returns a set of all y (or a set of all x) that satisfies P(x, y) for each given x (or y)); and (5) P(true|x, y), P(false|x, y). A term annotated with this enumeration pattern is a function that returns true/false if x, y satisfy P(x, y).

Enumeration patterns for n-arity predicates can be similarly defined. As needed, types can be attached predicates arguments. For example, an enumeration pattern associated with types $T_1$ and $T_2$ and predicate P can be P(x: $T_1$|y: $T_2$).

At block 310, a set of annotated terms is generated. Each term of the set of annotated terms, also referred to herein as set A, can be annotated with an enumeration pattern for each predicate. Generating the set of annotated terms can include preparing terms (e.g., table data and/or function code) as building blocks, and annotating enumeration patterns with each term using predicates which can be used in a possible formal specification. In some embodiments, the set of annotated terms can be generated by engineers.

The set of annotated terms represents a knowledge base with respect to how each predicate can be realized or implemented as a term. For example, a data set (or table data) can be interpreted as a term annotated with an enumeration pattern P(x|-) for a predicate P, and a function can be interpreted as a term annotated with Q(x|z) for a predicate Q.

At block 320, problem text is translated into a formal specification. The translation can be performed using any suitable natural language processing technique in accordance with the embodiments described herein. For example, the formal specification can be described by engineers, or can be generated and received from another system.

The formal specification describes a set of rules associated with the predicates. For example, the formal specification can be described as Datalog rules including predicates and tags (e.g., @partial, @given, @all).

As used herein, @partial means that some (not all) elements need to be found, @given means that the formal specification needs terms satisfying P(x, y) under the condition that values for the tagged variable are given (the term must be a function) and @all means that all elements need to be found. For example, for the formal specification P(x@all, y@given):-R(y, z), Q(z, x), a function can be synthesized that returns x satisfying R(y, z) and Q(z, x) from y.

Let the rule set (e.g., logical formula) including a set of extended rules (e.g., extended Datalog rules) be defined as $R_s$. The rule set $R_s$ can include target relations (e.g., a set of extended Datalog rules). For example, an extended Datalog rule of the rule set $R_s$ can be of the following form:
head:-$body_1$, . . . , $body_n$,
head::=HR($x_1$@$tag_1$, . . . , $x_k$@$tag_k$, $y_1$, . . . , $y_m$),
body::=L|not-L, and
L::=R($x_1$, . . . , $x_n$),
where "head" is an atomic symbol that refers to a head relation (HR), and each $body_k$ (1≤k≤n) is an atomic symbol that refers to either a literal L or a literal negation not-L. That is, the HR can include goal tags, and "$body_1$, . . . , $body_n$" refers to a series of literals L and/or literal negations not-L. Each literal L can refer to a body relation R($x_1$, . . . , $x_n$), and the body relation R($x_1$, . . . , $x_n$) can be a predicate when a term using an enumeration pattern of the relation is defined in the set A. In summary, "head:-$body_1$, . . . , $body_n$," states that relation A (e.g., the relation which "head" refers to) holds when all relations "$body_1$, . . . , $body_n$" (e.g., all the relations in the relation series which "$body_1$, . . . , $body_n$" refers to) hold.

At block 330, at least one term satisfying the formal specification is synthesized based on the set of annotated terms to generate a computer program. The at least one synthesized term can include, e.g., table data or a program. More specifically, the at least one synthesized term can be included in a set of terms, $t_s$, that can satisfy target relations of the rule set $R_s$ under the set A. The synthesis can be performed by searching acceptable combinations of terms in the knowledge base using the information of enumeration patterns annotated to each term. In one embodiment, synthesizing the at least one term satisfying the formal specification includes assigning each predicate P in a formal specification with a term T annotated with an enumeration pattern using the predicate P to obtain a term combination, and checking that the term combination satisfies the logical formula by using enumeration patterns annotated to the assigned terms.

More specifically, synthesizing the at least one term can further include, at block 332, assigning a realization type and a term to each instance of a predicate in the given rules based on an interpretation procedure. For example, realization types can be of the form $rt_1$, . . . , $rt_k$, and the set of terms $t_s$ can be of the form $t_1$, . . . , $t_k$. The assignment can generate realization statements.

A realization type can be of the form [x/y|z] or [b|z], where b is either true or false. Here, the syntax "x/y" as used herein separates the variables associated with x (e.g., $x_1$, . . . , $x_n$) from the variables associated with y (e.g., $y_1$, . . . , $y_m$).

A realization type of the form [x/y|z] refers to a function that takes z and returns a set including all x and some y. More specifically, the realization type [x/y|z] can mean that each term t in the realization statement A|-$R_1$, . . . , $R_n$|>t:[$x_1$, . . . , $x_n$/$y_1$, . . . , $y_m$|z] enumerates all values for $x_1$, . . . , $x_n$ and some values for $y_1$, . . . , $y_m$ which satisfy $R_1$, . . . , $R_n$ when z is given. The syntax "A|-B" as used herein means "under A, B holds" and the syntax "$R_1, \ldots, R_n |{>} t{:}r$" as used herein means that "$R_1, \ldots, R_n$ is realized by term t according to the realization type r".

A realization type of the form [b|z] refers to a function that takes z and returns either true or false, since b can be either true or false. More specifically, the realization type can be of the form $[x_1, \ldots, x_n/y_1, \ldots, y_m|z_1, \ldots, z_k]$ or $[b|z_1, \ldots, z_k]$, where $x_1, \ldots, x_n, y_1, \ldots, y_m$, and $z_1, \ldots, z_k$ are variables.

A realization statement "$A|{-}R_1, \ldots, R_n|{>}t{:}r_t$" can be written when term t and realization type $r_t$ can be assigned to the series of relations $R_1, \ldots, R_n$, and the set $A|{-}P_i|{>}t_i{:}r_{t_i}$ includes the realization statements for all instances of predicates P appearing in the rule set $R_s$.

A realization statement $A|{-}R_1, \ldots, R_n|{>}t{:}[x_1, \ldots, x_n/y_1, \ldots, y_m|z_1, \ldots, z_k]$ means that, given $z_k$, $t(z_1, \ldots, z_k)$ enumerates all $x_1, \ldots, x_n$ and some $y_1, \ldots, y_m$ such that $x_1, \ldots, x_n, y_1, \ldots, y_m$, and $z_1, \ldots, z_k$ satisfy $R_1, \ldots, R_n$.

A realization statement $A|{-}R_1, \ldots, R_n|{>}t{:}[b|z_1, \ldots, z_k]$ means that, given $z_1, \ldots, z_k$, $t(z_1, \ldots, z_k)$ returns b (true or false) if $z_1, \ldots, z_k$ satisfy $R_1, \ldots, R_n$.

A realization statement $A|{-}R_1, \ldots, R_n|{>}t{:}[x_1, \ldots, x_n/y_1, \ldots, y_m|{-}]$ means that, t enumerates all $x_1, \ldots, x_n$ and some $y_1 y_m$ such that $x_1, \ldots, x_n, y_1, \ldots, y_m$ satisfy $R_1, \ldots, R_n$.

Synthesizing the at least one term can further include, at block 334, performing a merge process associated with literals based on the interpretation procedure. Performing the merge process can include merging literals or realization statements for literals in each rule based on the interpretation procedure. For example, predicates and realization types can be merged at the same time based on the interpretation procedure if the target realization types can be merged. If the realization types cannot be merged, the system/method can try to merge other literals. If the system/method fails to merge any combination of literals under the assignment, the system/method can abandon its assignment. The merging can be performed until all possible realization statements are obtained based on the merging.

For example, assume that the following realization statements have already been obtained at block 532: $A|{-}P_1|{>}t_1{:}[x, y/{-}|{-}]$ and $A|{-}P_2|{>}t_2{:}[y/{-}|z]$, which refers to a function for $P_2$ which takes z and returns y and that all data set (x, y) which satisfies $P_1$. Here, for the rule $HR(x, z@given){:}{-}P_1(x, y), P_2(y, z)$, the literals $P_1(x, y)$ and $P_2(y, z)$ can be merged to obtain the realization statement $A|{-}P_1, P_2|{>}\lambda_z.\{x|{<}x, y{>}$ in $t_1$ and $y=t_2(z)\}{:}[x/{-}|z]$, where $\lambda_z.\{x|{<}x, y{>}$ in $t_1$ and $y=t_2(z)\}$ is a function that takes z and returns a set of x such that tuple $<x, y>$ is included in $t_1$ and $y=t_2(z)$ (a function that satisfies $P_1, P_2$ in the sense that the function takes z and returns x, where x, z satisfy $P_1(x, y)$ and $P_2(y, z)$.

As another example, consider the formal specification $P(y@all, x@given){:}{-}R(y, w), Q(w, z), S(z, y)$. An example of realization types that can be assigned to the predicates R, Q and S is provided as follows:

$R(y, w)|{>}t_r{:}[true|y, w]$,
$Q(w, z)|{>}t_q{:}[z|{-}/w]$,
$S(z, x)|{>}t_s{:}[z|{-}/x]$.

The system/method can attempt to merge R and Q, then Q and S, and R and S. However, the result of this merge attempt is that all merge trials fail. Accordingly, the system/method can abandon this assignment. In contrast, another example of realization types that can be assigned to the predicates R, Q and S is provided as follows:

$R(y, w)|{>}t_r{:}[y|{-}/w]$,
$Q(w, z)|{>}t_q{:}[w|{-}/z]$,
$S(z, x)|{>}t_s{:}[z|{-}/x]$.

The system/method can attempt to merge R and Q and obtain $R(y, w), Q(w, z)|{>}\lambda z.\{<y, w>|w=t_q(z), t_r(w)=y\}{:}[y|{-}/z]$. Here, R and Q can be merged and realization types $[y|{-}/w]$ and $[w|{-}/z]$ can be merged to $[y, w|{-}/z]$. The system/method can then merge R, Q and S and realization types $[y|{-}/w]$ and $[z|{-}/x]$ can also be merged. As a result, "$R(y, w), Q(w, z), S(z, x)|{>}t{:}[y, w, z|{-}/x]$" can be obtained, where $t=\lambda x.\{<y, w, z>|w=t_q(z), t_r(w)=y, z=ts(x)\}$.

Synthesizing the at least one term can further include, at block 336, obtaining a realization statement for each head statement in the rule set $R_s$.

For example, for the rule $HR(x_1, \ldots, x_k){:}{-}L_1, \ldots, L_n$ (the goal tag is irrelevant to the steps here), for a statement $A|{-}L_1, \ldots, L_n{:}t|{>}r_t$, the statement $A|{-}HR(x_1, \ldots, x_k)|{>}t|{>}r_t$ can be obtained. In other words, if a term t satisfies $L_1, \ldots, L_n$ in the sense of $r_t$, then the term t also satisfies HR in the sense of $r_t$. For example, for the rule $HR(x, z@given){:}{-}P_1(x, y), P_2(y, z)$, the following realization statement can be obtained: $A|{-}HR(x, z@given)|{>}\lambda_z.\{x|{<}x, y{>}$ in $t_1$ and $y=t_2(z)\}|[x/{-}|z]$.

Synthesizing the at least one term can further include, at block 338, checking goal tags for each realization statement.

For example, for the rule "$HR(x_1@all \ldots x_k@all, y_1@partial, \ldots, y_n@partial, z_1@given, \ldots, z_m@given){:}{-}L_1, \ldots, L_n$" or for the statement "$A|{-}HR( \ldots )|{>}t{:}[x_1 \ldots x_k/y_1 \ldots y_n|z_1 \ldots z_m]$", the term t can be output as program or data which satisfies HR( . . . ). For the statement "$A|{-}HR(x, z@given)|{>}\lambda_z.\{x|{<}x, y{>}$ in $t_1$ and $y=t_2(z)\}|[x/{-}|z]$", the term $\lambda_z.\{x|{<}x, y{>}$ in $t_1$ and $y=t_2(z)\}$ can be output as a function that satisfies $HR(x, z@given)$.

The process can revert back to block 334 to obtain other realization statements to generate the computer program.

At block 340, the computer program is output. The computer program can be output in accordance with any suitable means. For example, the computer program can be stored in a database, transmitted or sent to one or more entities over a network, etc.

Interpretation rules for the interpretation procedure can define how to infer the realization statement.

Interpretation rule [Base Rule] assigns predicates (i.e. relations that is used in enumeration pattern in A) to the realization statements. For example, if $P(true|x_1, \ldots, x_k)$ in A, then $A|{-}P(x_1, \ldots, x_k)|{>}[true|x_1, \ldots, x_k]$ can be inferred.

Interpretation rule [Rule: V-V] merges two series of relations $R_{1_1}, \ldots, R_{1_n}$ and $R_{2_1}, \ldots, R_{2_m}$ where $A|{-}R_{1_1}, \ldots, R_{1_n}|{>}t_1{:}r_{t_1}$ and $A|{-}R_{2_1}, \ldots, R_{2_m}|{>}t_2{:}r_{t_2}$ have already been inferred and both $r_{t_1}$ and $r_{t_2}$ are of the form $[x_1, \ldots, x_n/y_1, \ldots, y_m|z_1, \ldots, z_k]$. This interpretation rule produces two possible realization statements.

Interpretation rule [Rule: T-T] merges two series of relations $R_{1_1}, \ldots, R_{1_n}$ and $R_{2_1}, \ldots, R_{2_m}$ where $A|{-}R_{1_1}, \ldots, R_{1_n}|{>}t_1{:}r_{t_1}$ and $A|{-}R_{2_1}, \ldots, R_{2_m}|{>}t_2{:}r_{t_2}$ have already been inferred and both $r_{t_1}$ and $r_{t_2}$ are of the form $[b|z_1, \ldots, z_k]$. For example, from $A|{-}R_1(x, z)|{>}t_1{:}[true|x, z]$ and $A|{-}R_2(y, z)|{>}t_2{:}[false|y, z]$, we get $A|{-}R_1(x, z), R_2(y, z)|{>}t_{12}{:}[true\&false|x, y, z]$, where $t_{12}=\lambda, x, y, z$ $(true=t_1(x, z)$ and $false=t_2(y, z))$. That is, the $t_{12}$ function takes x, y, z and calculates $true=t_1(x, z)$ and $false=t_2(y, z)$, and returns the resulting Boolean value.

Interpretation rule [Rule: T-V] merges two series of relations $R_{1_1}, \ldots, R_{1_n}$ and $R_{2_1}, \ldots, R_{2_m}$ where $A|{-}R_{1_1}, \ldots, R_{1_n}|{>}t_1{:}r_{t_1}$ and $A|{-}R_{2_1}, \ldots, R_{2_m}|{>}t_2{:}r_{t_2}$ have already been inferred, $r_{t_1}$ is of the form $[x_1, \ldots, x_n/y_1, \ldots, y_m|z_1, \ldots, z_k]$ and $r_{t_2}$ is of the form $[b|z_1, \ldots, z_k]$.

Interpretation rule [Weak Rule: W-C] means that we can obtain $A|{-}R_{2_1}, \ldots, R_{2_m}, R_{1_1}, \ldots, R_{1_n} \triangleright t{:}r_t$ from $A|{-}R_{1_1}, \ldots, R_{1_n}, R_{2_1}, \ldots, R_{2_m} \triangleright t{:}r_t$. Accordingly, this interpretation rule means the order of relations can be changed.

Interpretation rule [Weak Rule: W-P] means that we can obtain $A|-R_1, \ldots, R_n|>t:[x_1, \ldots, x_{1_m}/x_{2_1}, \ldots, x_{2_k}, y \ldots |z \ldots ]$ from $A|-R_1, \ldots, R_n|>t:[x_1, \ldots, x_{1_m}, x_{2_1}, \ldots, x_{2_k}/y \ldots |z \ldots ]$. Accordingly, this interpretation rule means that if the elements for $x_{2_1}, \ldots, x_{2_k}$ are declared to be all enumerated, then it may be declared that some of them are enumerated.

Interpretation rule [Weak Rule: W-G] means that we can obtain $A|-R_1, \ldots, R_n|>t':[x_{s_1}, x_{s_2}/y_{s_1}, y_{s_2}|z_s, x, y]$ from $A|-R_1, \ldots, R_n|>t:[x_{s_1}, x, x_{s_2}/y_{s_1}, y, y_{s_2}|z_s]$, where $t'=\lambda x \cdot y$.

$$\{\langle v_{x_{s_1}}, v_{x_{s_2}}, v_{y_{s_1}}, v_{y_{s_2}} \rangle | \langle v_{x_{s_1}}, v_x, v_{\alpha_2}, v_{\beta_1}, v_y, v_{\beta_2} \rangle \text{ in}$$
$$t(z_s) \text{ and } x = v_x, y = v_y\}: [x_{s_1}, x_{s_2}/y_{s_1}, y_{s_2} | z_s, x, y].$$

The function t' takes x and y as input, calculates $t(z_s)$ and collects $$\langle v_{x_{s_1}}, v_{x_{s_2}}, v_{y_{s_1}}, v_{y_{s_2}} \rangle$$

such that $$\langle v_{x_{s_1}}, v_x, v_{\alpha_2}, v_{\beta_1}, v_y, v_{\beta_2} \rangle$$

in $t(z_s)$ and $x=v_x$, $y=v_y$, and returns the set of $$\langle v_{x_{s_1}}, v_{x_{s_2}}, v_{y_{s_1}}, v_{y_{s_2}} \rangle.$$

This rule means that, if t realized $R_1, \ldots, R_n$ in the sense of $[x_{s_1}, x_{s_2}/y_{s_1}, y_{s_2}|z_s, x, y]$ (e.g., t enumerates all x and some y which satisfy $R_1, \ldots, R_n$), then the term t' can be obtained, which realizes $R_1, \ldots, R_n$ in the sense of $[x_{s_1}, x_{s_2}/y_{s_1}, y_{s_2}|z_s, x, y]$ (e.g., t' takes x and y along with $z_s$ and returns a data set $$\langle x_{s_1}, x_{s_2} y_{s_1}, y_{s_2} \rangle$$

that satisfies $R_1, \ldots, R_n$). Here, all elements for $x_{s_1}$ and $x_{s_2}$ are enumerated and some elements for $y_{s_1}$ and $y_{s_2}$ are enumerated.

These example interpretation rules can be used to implement blocks 332 and/or 338.

Interpretation rule [Head Rule: H], which can infer a realization statement for a head relation from a realization statement for its bodies (e.g., body relation series), can be used to implement blocks 336 and/or 338.

As an example, consider the predicate "PrimeBaseRep(q, L)", which means that list of natural number L is the prime base representation ("PBR") of natural number q>2. The prime base representation of q can be given by the list of natural number $[p_k, e_k, \ldots, p_1, e_1]$ such that $p_k^{e_k} \times \ldots \times p_1^{e_1} = q$ and $p_i(1 \leq i \leq k)$ is a prime number and $e_i(1 \leq i \leq k)$ is a positive integer and $p_j > p_i$ for $(1 \leq i < j \leq k)$. For example, the prime base representation of q=12 can be given by [3,1,2,2], since $3^1 \times 2^2 = 3 \times 4 = 12$. Assuming there are two programs convertPBR(q) and primeNumberOf(L) for calculating prime base representation for prime number q and prime number for prime base representation L, respectively, convertPBR (q) and primeNumberOf(L) can be annotated with enumeration patterns as follows:

convertToPBR(q)>>PrimeBaseRep(L|q),
primeNumberOf(L)>>PrimeBaseRep(q|L).

These annotated terms can be included as the knowledge base including in the dataset.

Now, consider the formal specification "Solution (nlst@given, mlst):-PrimeBaseRep(y,nlst), PrimeBaseRep (y−1, mlst)", which can be received as input. Here, nlst and mlst are variable names, where nlst is a list expressing a prime base representation and mlst is a list expressing the prime base representation to be obtained by the system/method. That is, this particular formal specification corresponds to a request to synthesize a function that finds mlst when given nlst, where mlst and nlst satisfy PrimeBaseRep (y,nlst) and PrimeBaseRep(y−1, mlst). The formal specification can be generated automatically based on the knowledge base using natural language processing from a natural description such as, e.g., "For given prime base representation L, find the prime base representation of y−1, where the prime base representation of y is L". Note that the sentence form "prime base representation of x is y" can be translated into the predicate PrimeBaseRep(x, y) using natural language processing.

Generally, a realization type [x/y|z] can represent terms in abstract way so that the terms can generate all values for x and some values for y when z is given, where x, y and z are variable names in the formal specification. In this illustrative example, the terms of the formal specification be abstracted by the system/method as a target realization type [mlst/-|nlst].

To determine a realization type that is acceptable for the target realization type, the system/method can obtain one or more realization types by assigning respective functions to the predicates of the formal specification.

For example, the function convertToPBR can be assigned to both predicates PrimeBaseRep(y,nlst) and PrimeBaseRep (y−1,mlst), and the system/method can obtain a first realization type ("$r_{t_1}$"), [y/-|nlst], [y−1/-|mlst], using the annotated enumeration pattern of the function convertToPBR. The first term of the first realization type $r_{t_1}$ can generate y from nlst and the second term of the first realization type $r_{t_1}$ that can generate y−1 from mlst. However, the first realization type $r_{t_1}$ is not acceptable for the target realization type, [mlst/-|nlst]. So, the system/method can try to find another assignment.

For example, if the function primeNumberOf is assigned to the first predicate PrimeBaseRep(y,nlst) and convertToRPB is assigned to the second predicate PrimeBaseRep (y−1,mlst), then the system/method can obtain a second realization type ("$r_{t_2}$") using the annotated enumeration pattern of the function convertToPBR: [y/-|nlst], [mlst/-|y−1]. The second realization type $r_{t_2}$ can include a first term that can generate y from nlst and a second term that can generate mlst from y−1. The second realization type $r_{t_2}$ indicates that the system/method can synthesize a program that satisfies the target situation expressed by the target realization type [mlst/-|nlst], since y can be generated from a given nlst by using the first assigned term and mlst can be generated from y by the second assigned term and calculating y−1. Accordingly, the system/method can synthesize a program having an input "nlst" and an output "mlst as convertToPBR(primeNumberOf(nlst)-1)".

As another example, let a set of annotated terms A, which expresses a database of partial knowledge on how to generate a program from a logical formula, be given by:

{λz, w. le_int(z, w)>>LessThan(true|x, y),
λz. makeListTo(0, z−1)>>LessThan(y|x),
λz. z+1>>LessThan(y<|x),
λz, if (z %2=0) then true else false>>Even(true|x)}.

Here, λ x, y, z. f(x, y, z) refers to a function with x, y, z as input and f(x, y, z) as output (λ-calculus syntax), and le_int(z, w) refers to a function which returns true if an only if ("iff") z<w. Then, LessThan(true|x, y), etc. can represent an enumeration pattern for a primitive predicate LessThan (x:int, y:int), where LessThan(x:int, y:int) means that integer x is less than integer y.

Given a target predicate P and logical formulas fs (in propositional logic) deriving the target predicate P, we can generally transform these into rules (e.g., Datalog rules). Let $R_s$ be the set of rules. We would like to generate possible terms (e.g., data or programs) that satisfy the target predicate and, thus, satisfy $R_s$. The problem can be expressed by A|-$R_s$~>$t_s$ (generate terms $t_s$ satisfying $R_s$ under the knowledge base A.

For example, let $R_s$={Q(x@all, y@all):-LessThan(x, y),MyData(x, y), P(z@partial):-LessThan(y, z), MyData(x, y)}, and assume that the annotated term set A contains the following three annotated terms:

λz, w. le_int(z, w)>>LessThan(true|x, y),
λx·x+1>>LessThan(y<|x),
{(1,2),(5,5),(9,8)}>>MyData(x, y|-), where le_int(z, w) is a function which returns true iff z<w. For the predicate LessThan(x:int, y:int), y=x+1 is a possible integer satisfying LessThan(x, y), which is why "<|" is used instead of "|" with respect to LessThan(y<|x). The solution for the target term t is, for example, can be obtained in accordance with the embodiments described herein by:

Q(x, y)={(x, y)|le_int(y, x)=true and (x, y) in {(1,2),(5,5),(9,8)}},
P(z@partial)={z|y+1 and (x, y) in {1(1,2),(5,5),(9,8)}}, where the solution t can be obtained as {(1,2)} for Q(x, y) and {3,6,9} for P(z).

As yet another example, consider the problem text "Find all integers z such that, for integer pairs x, y contained in dataset S, double of x is z and double of z is y." The system/method can transform this problem text into a logical expression and generate a program from the logical expression. For example, when the problem text is transformed into a logical expression, the following logical formula (Datalog rule) can be obtained: Answer(z@all):-S(x, y), Double(x, z), Double(z, y). Here, S(x, y) means that the integer pair x, y is contained in the data set S, and Double (a, b) indicates that double or twice a equals b.

Now, assume that a set of annotated terms A includes the following annotated terms for the predicate Double(a, b):

$t_1$>>Double(b|a), where $t_1$=λa. {2a},
$t_2$>>Double(a|b), where $t_2$=λb. if (b mod 2==0) then {b/2} else { }.

The first term $t_1$ refers to a function that takes an integer a and returns the set containing only the integer 2a, and the second term $t_2$ refers to a function that takes an integer b and returns the set containing only the integer b/2 iff b/2 is an integer, otherwise returns empty set.

Also, assume that the set A further includes the following annotated term for the predicate S(x, y): {<1,4>,<2,4>,<3, 4>,<2,8>}>>S(x, y|-) (which means we have data set for S).

The following realization statement can be inferred in accordance with the embodiments described herein:

A|-S(x, y), Double(x, z), Double(z, y)|>t:[x, y, z|-/-],
where t={<$v_x$, $v_y$, $v_z$>|<$v_x$, $v_y$> in S(x, y) and $v_z$ in $t_1(v_x)$ and $v_y$ in $t_2(v_z)$}.

Calculating t, "A|-R(x, y, z)|>{<1,4,2>,<2,8,4>}:[x, y, z|/-] for R(x, y, z)=S(x, y), Double(x, z), Double(z, y)" can be obtained, from which "A|-Answer(z@all)|>{<2>,<4>}: [z|/-]" can be obtained. Thus, the answer is {<2>,<4>} from the rule Answer(z@all):-R(x, y, z).

Handling predicates in the manner described in this example is more flexible than in other systems/methods. For example, other systems/methods may need to obtain the solution using different operators (e.g., multiplying by 2 and dividing by 2 with respect to Answer(z@all):-S(x, y), z=2x, z=y/2) to formalize the same sentence "double of_is_".

The embodiments described herein provide a program synthesis or generation framework. In this framework, an interpretation of each predicate based on rules (e.g., Datalog rules) is not pre-defined. Instead, the interpretation of each predicate can be dynamically chosen from a set of annotated terms A according to the context in which the predicate appears in the logical expression of the rules. This feature allows for flexible use of user-defined external predicates (e.g., not only in a specific form such as a one-way function but also in various possible reasoning directions), as opposed to using built-in predicates to which a specific interpretation is allocated.

In accordance with the embodiments described herein, the predicate does not represent only table data, but it can be interpreted variously depending on its appearance position and background knowledge (e.g., set of annotated terms A). This makes it possible to describe a specification (e.g., Datalog rules) more declaratively in order to describe relations with the same meaning using the same predicate, regardless of how the relations are realized in the program synthesis.

Figure 4:
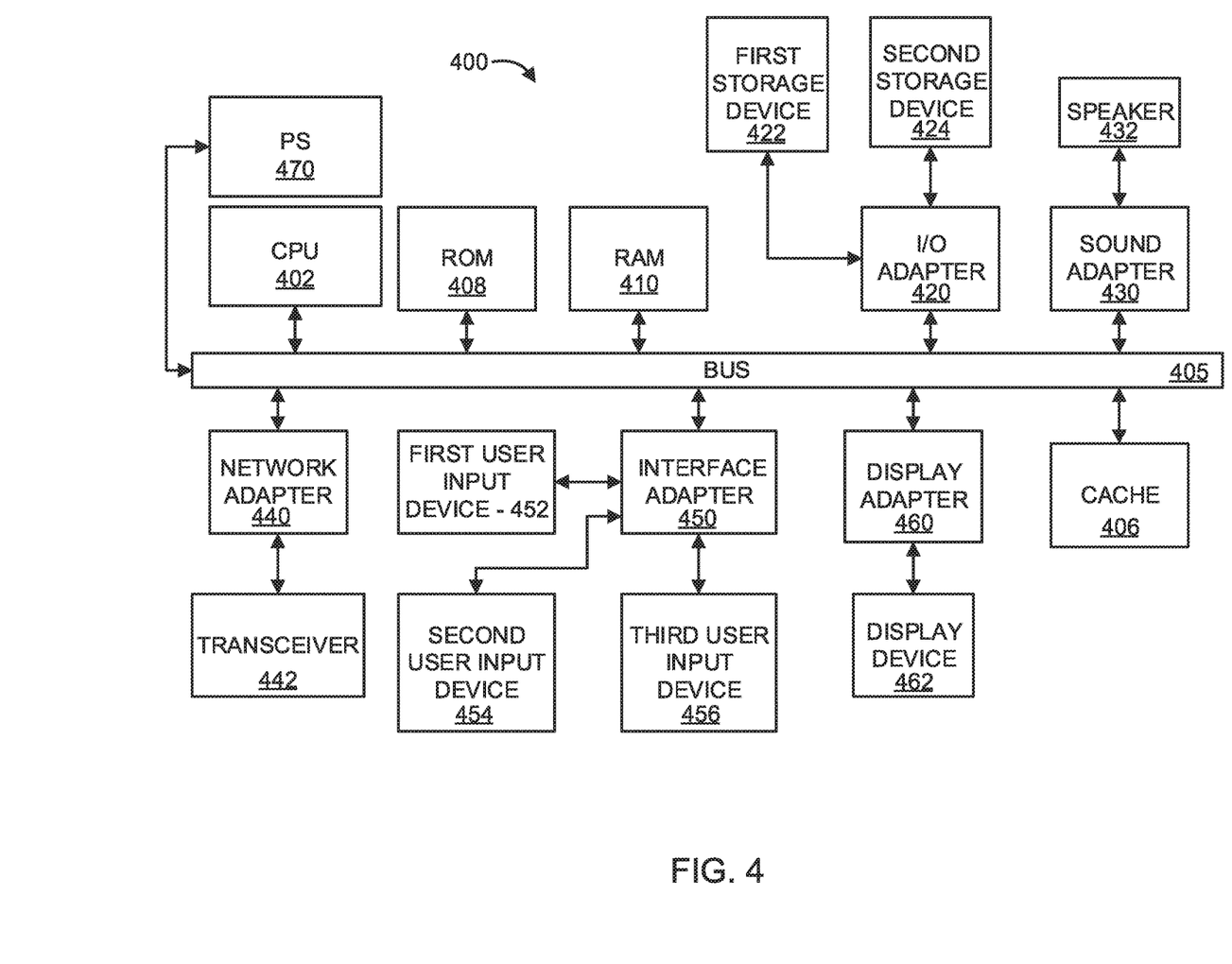
FIG. 4 is a block diagram of a processing system, in accordance with an embodiment of the present invention.

With reference to FIG. 4, an exemplary processing system 400 to which the present invention may be applied is shown in accordance with one embodiment. The processing system 400 includes at least one processor (CPU) 104 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 452, 454, and 456 can be the same type of user input device or different types of user input devices. The user input devices 452, 454, and 456 are used to input and output information to and from system 400.

Program synthesis (PS) component 470 may be operatively coupled to system bus 402. PS component 470 is configured to perform one or more of the operations described above with reference to FIG. 3. PS component 470 can be implemented as a standalone special purpose hardware device, or may be implemented as software stored on a storage device. In the embodiment in which PS component 470 is software-implemented, although the anomaly detector is shown as a separate component of the computer system 400, PS component 470 can be stored on, e.g., the first storage device 422 and/or the second storage device 424. Alternatively, PS component 470 can be stored on a separate storage device (not shown).

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
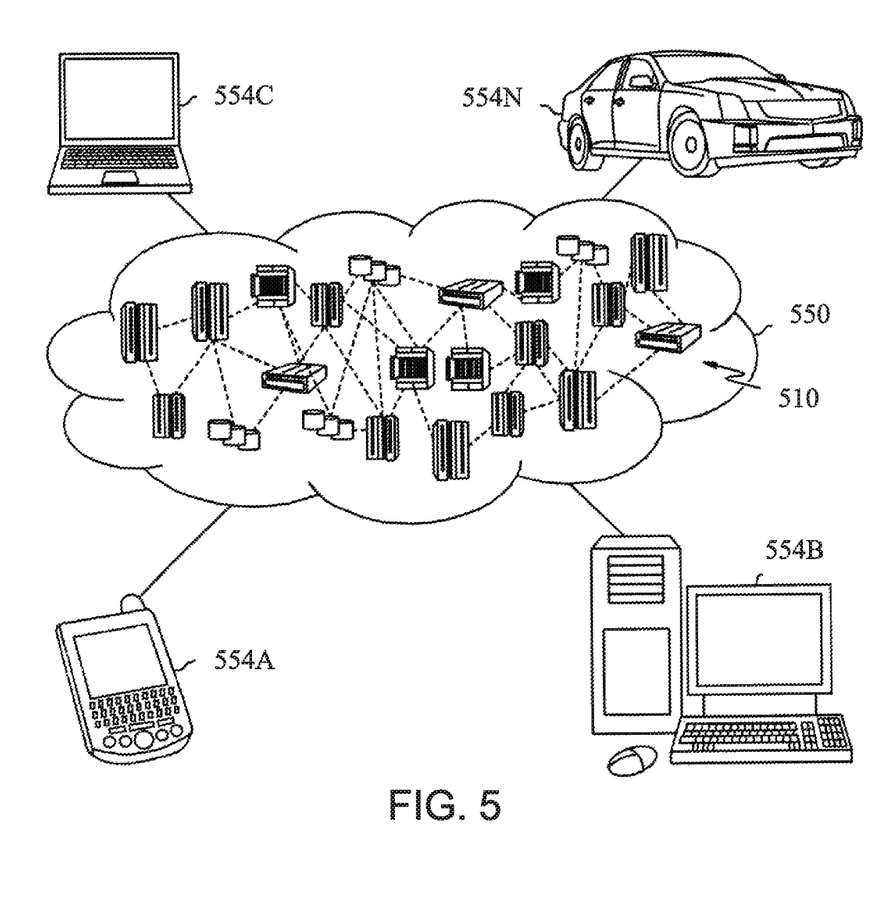
FIG. 5 is a block diagram of an illustrative cloud computing environment having one or more cloud computing nodes with which local computing devices used by cloud consumers communicate, in accordance with an embodiment of the present invention.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
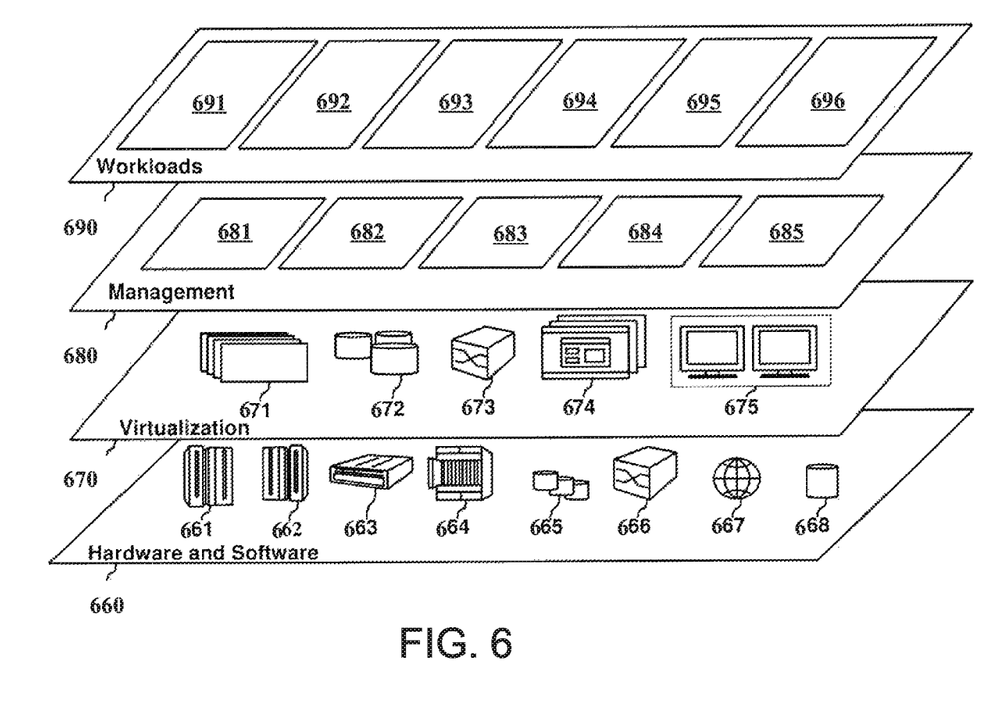
FIG. 6 is a block diagram of a set of functional abstraction layers provided by a cloud computing environment, in accordance with an embodiment of the present invention.

Referring now to FIG. 6, a set of functional abstraction layers provided by cloud computing environment 650 (FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and computer program synthesis 696.

Having described preferred embodiments of program synthesis for external predicates using annotations based on enumeration patterns (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for computer program synthesis using annotations based on enumeration patterns, comprising:
    a memory device for storing program code;
    at least one processor device operatively coupled to the memory device and configured to execute program code stored on the memory device to:
    obtain a set of annotated terms including one or more terms each annotated with a stored, partial enumeration pattern;
    translate problem text into logical expressions including a set of external predicates in a formal specification using natural language processing, the formal specification including a set of rules associated with a set of external predicates;
    determine whether enumerating elements of an external predicate from the set of external predicates satisfies the stored, partial enumeration pattern, annotate the external predicate responsive to a determination that enumerating elements of the external predicate satisfies the stored, partial enumeration pattern, and store relations between two or more external predicates from the set of external predicates; and
    generate a computer program by converting the logical expressions into computable terms by synthesizing one or more terms satisfying the set of rules of the formal specification based on the set of annotated terms using existing terms, the synthesizing the one or more terms satisfying the set of rules comprising:
    assigning each predicate P in the formal specification with a term T annotated with an enumeration pattern using the predicate P to obtain a term combination, and checking that the term combination satisfies a logical formula by using enumeration patterns annotated to the assigned terms;
    generating first realization statements by assigning realization types and terms to each predicate P based on an interpretation procedure, the interpretation procedure comprising applying one or more interpretation rules defining how to infer the first realization statements; and generating second realization statements by merging literals or realization statements for literals in each rule of the set of rules based on the interpretation procedure; and wherein
    the one or more interpretation rules in the interpretation procedure include an interpretation rule V-V for generating two possible realization statements.

2. The system of claim 1, wherein the at least one processor device is further configured to receive the set of annotated terms as a knowledge base pertaining to how each predicate can be transformed to terms.

3. The system of claim 1, wherein the set of annotated terms include table data or function code.

4. The system of claim 1, wherein the formal specification is described as a set of rules including the predicates and corresponding goal tags.

5. The system of claim 4, wherein the at least one processor device is further configured to synthesize the one or more terms by:
obtaining third realization statements each corresponding to a head relation in the set of rules; and
checking goal tags for the realization statements.

6. The system of claim 1, wherein the set of rules includes a set of Datalog rules.

7. The system of claim 1, wherein the one or more interpretation rules include an interpretation rule V-V for generating two possible realization statements by merging two series of relations $R_{1_1}, \ldots, R_{1_n}$ and $R_{2_1}, \ldots, R_{2_m}$ where $A|-R_{1_1}, \ldots, R_{1_n}|>t_1:r_{t_1}$ and $A|-R_{2_1}, \ldots, R_{2_m}|>t_2:r_{t_2}$ have already been inferred and both $r_{t_1}$ and $r_{t_2}$ are of the form $[x_1, \ldots, x_n/y_1, \ldots, y_m|z_1, \ldots, z_k]$.

8. The system of claim 1, wherein the realization type is of the form [x/y/z] and refers to a function that takes z and returns a set including all x and some y such that each term t in a realization statement $A|-R_1, \ldots, R_n|>t:[x_1, \ldots, x_n/y_1, \ldots, y_m|z]$ enumerates all values for $x_1, \ldots, x_n$ and some values for $y_1, \ldots y_m$ which satisfy $R_1, \ldots, R_n$ when z is given, wherein syntax A|-B means that under A, B holds, and syntax $R_1, \ldots, R_n|>t:r$ means that $R_1, \ldots, R_n$ is realized by term t according to the realization type r.

9. A computer-implemented method for program synthesis using annotations based on enumeration patterns, comprising:
obtaining a set of annotated terms including one or more terms each annotated with a stored, partial enumeration pattern;
translating problem text into logical expressions including a set of external predicates in a formal specification using natural language processing, the formal specification including a set of rules associated with a set of external predicates;
determining whether enumerating elements of an external predicate from the set of external predicates satisfies the stored, partial enumeration pattern, annotating the predicate responsive to a determination that enumerating elements of the predicate satisfies the stored, partial enumeration pattern, and storing relations between two or more external predicates from the set of predicates; and
generating a computer program by converting the logical expressions into computable terms by synthesizing one or more terms satisfying the set of rules of the formal specification based on the set of annotated terms using existing terms, the synthesizing the one or more terms satisfying the set of rules comprising:
assigning each predicate P in the formal specification with a term T annotated with an enumeration pattern using the predicate P to obtain a term combination, and checking that the term combination satisfies a logical formula by using enumeration patterns annotated to the assigned terms;
generating first realization statements by assigning realization types and terms to each predicate P based on an interpretation procedure, the interpretation procedure comprising applying one or more interpretation rules defining how to infer the first realization statements; and generating second realization statements by merging literals or realization statements for literals in each rule of the set of rules based on the interpretation procedure; and wherein
the one or more interpretation rules in the interpretation procedure include an interpretation rule V-V for generating two possible realization statements.

10. The method of claim 9, further comprising receiving the set of annotated terms as a knowledge base pertaining to how each predicate can be transformed to terms.

11. The method of claim 9, wherein the set of annotated terms include table data or function code.

12. The method of claim 9, wherein the formal specification is described as a set of rules including the predicates and corresponding goal tags.

13. The method of claim 12, wherein synthesizing the one or more terms further includes:
obtaining third realization statements each corresponding to a head relation in the set of rules; and
checking the goal tags for the realization statements.

14. The method of claim 9, wherein the set of rules includes a set of Datalog rules.

15. A computer program product comprising a non-transitory computer readable storage medium having program instructions embodied therewith, the program instructions executable by a computer to cause the computer to perform a method for program synthesis using annotations based on enumeration patterns, the method performed by the computer comprising:
obtaining a set of annotated terms including one or more terms each annotated with a stored, partial enumeration pattern;
translating problem text into logical expressions including a set of external predicates in a formal specification using natural language processing, the formal specification including a set of rules associated with a set of external predicates;
determining whether enumerating elements of an external predicate from the set of external predicates satisfies the stored, partial enumeration pattern, annotating the predicate responsive to a determination that enumerating elements of the predicate satisfies the stored, partial enumeration pattern, and storing relations between two or more external predicates from the set of predicates; and
generating a computer program by converting the logical expressions into computable terms by synthesizing one or more terms satisfying the set of rules of the formal specification based on the set of annotated terms using existing terms, the synthesizing the one or more terms satisfying the set of rules comprising:
assigning each predicate P in the formal specification with a term T annotated with an enumeration pattern using the predicate P to obtain a term combination, and checking that the term combination satisfies a logical formula by using enumeration patterns annotated to the assigned terms;
generating first realization statements by assigning realization types and terms to each predicate P based on an interpretation procedure, the interpretation procedure comprising applying one or more interpretation rules defining how to infer the first realization statements: and generating second realization statements by merging literals or realization statements for literals in each rule of the set of rules based on the interpretation procedure, and wherein
the one or more interpretation rules in the interpretation procedure include an interpretation rule V-V for generating two possible realization statements.

16. The computer program product of claim 15, wherein the method further includes receiving the set of annotated terms as a knowledge base pertaining to how each predicate can be transformed to terms.

17. The computer program product of claim 15, wherein the set of annotated terms include table data or function code.

18. The computer program product of claim 15, wherein the formal specification is described as a set of rules including the predicates and corresponding goal tags.

19. The computer program product of claim 18, wherein synthesizing the one or more terms further includes:
   obtaining third realization statements each corresponding to a head relation in the set of rules; and
   checking the goal tags for the realization statements.

* * * * *